(12) United States Patent
Wang et al.

(10) Patent No.: US 12,436,416 B1
(45) Date of Patent: Oct. 7, 2025

(54) OPTICS RING MODULATOR INCLUDING GRATING PILLAR

(71) Applicant: Marvell Asia Pte Ltd., Singapore (SG)

(72) Inventors: Wanjun Wang, Singapore (SG); Xiaoguang Tu, Singapore (SG); Masaki Kato, Palo Alto, CA (US)

(73) Assignee: Marvell Asia Pte Ltd, Singapore (SG)

( * ) Notice: Subject to any disclaimer, the term of this patent is extended or adjusted under 35 U.S.C. 154(b) by 262 days.

(21) Appl. No.: 18/224,700

(22) Filed: Jul. 21, 2023

Related U.S. Application Data

(60) Provisional application No. 63/391,408, filed on Jul. 22, 2022.

(51) Int. Cl.
  *G02F 1/025* (2006.01)
  *G02B 6/12* (2006.01)

(52) U.S. Cl.
  CPC .... *G02F 1/025* (2013.01); *G02B 2006/12142* (2013.01); *G02F 2201/063* (2013.01); *G02F 2203/15* (2013.01)

(58) Field of Classification Search
  CPC ........... G02B 2006/12142; G02F 1/025; G02F 2201/063; G02F 2203/15

USPC ......................................................... 385/1–3
  See application file for complete search history.

(56) References Cited

U.S. PATENT DOCUMENTS

| | | | |
|---|---|---|---|
| 7,298,949 B2 * | 11/2007 | Gothoskar | G02F 1/025 385/2 |
| 10,866,440 B1 * | 12/2020 | Cho | G02F 1/025 |
| 11,086,189 B1 * | 8/2021 | Tu | G02F 1/212 |
| 11,609,475 B2 * | 3/2023 | Rakowski | G02F 1/2257 |
| 2017/0038609 A1 * | 2/2017 | Luo | G02F 1/2255 |
| 2020/0124883 A1 * | 4/2020 | Delisle-Simard | G02F 1/025 |

* cited by examiner

*Primary Examiner* — Robert Tavlykaev

(57) ABSTRACT

A silicon photonics modulator includes a substrate, a PN junction disposed on the substrate, the PN junction formed by a first L-shaped region doped with a p-type doping abutting a second L-shaped region doped with an n-type doping, a first plurality of regions each having different p-type doping concentrations greater than the first L-shaped region, and a second plurality of regions each having different n-type doping concentrations greater than the second L-shaped region. The silicon photonics modulator includes a first electrical contact on one of the first plurality of regions, a second electrical contact on one of the second plurality of regions, and multiple grating pillars doped with the n-type doping or the p-type doping, each of the multiple grating pillars spaced apart from the PN junction and spaced apart from one another.

22 Claims, 6 Drawing Sheets

OPTICS RING MODULATOR INCLUDING GRATING PILLAR

CROSS-REFERENCE TO RELATED APPLICATION

This application claims the benefit of U.S. Provisional Application No. 63/391,408, filed on Jul. 22, 2022. The entire disclosure of the application referenced above is incorporated herein by reference.

FIELD

The present disclosure relates to silicon photonics modulators including grating pillars, such as ring modulators, which may reduce an electrical resistance of the ring modulator to facilitate a higher data bandwidth of optical signal transmission.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The demand for data bandwidth is dramatically increasing. Applications such as social networking, high-definition videos, artificial intelligence systems and cloud services, among others, are driving the growing demand for low-cost and high data bandwidth communication system. Silicon photonics technology, which may include multiple photonics components on a single photonics integrated circuit chip, is one solution for communication systems. Silicon photonics technology provides various advantages, for example due to its low-cost, CMOS-compatible fabrication processes, and high-volume integration.

A high-speed silicon modulator is a key component in an optical network. The optical modulator converts an electrical signal to the modulated optical signal, which is transmitted to a destination (or can also be used for converting received optical signals into electrical signals under some conditions). High data-rate optical communication between data centers desires a high-speed, compact, and energy-efficient modulator. A ring modulator is one of the powerful light engines, and has a small footprint with low-loss and large-scale integration capability.

SUMMARY

A silicon photonics modulator includes a substrate, a PN junction disposed on the substrate, the PN junction formed by a first L-shaped region doped with a p-type doping abutting a second L-shaped region doped with an n-type doping, a first plurality of regions doped with the p-type doping arranged adjacent to the first L-shaped region on the substrate, the first plurality of regions each having different doping concentrations which are greater than a doping concentration of the first L-shaped region, and a second plurality of regions doped with the n-type doping arranged adjacent to the second L-shaped region on the substrate, the second plurality of regions each having different doping concentrations which are greater than a doping concentration of the second L-shaped region. The silicon photonics modulator includes a first electrical contact disposed on one of the first plurality of regions having the highest p-type doping, a second electrical contact disposed on one of the second plurality of regions having the highest n-type doping, and multiple grating pillars disposed on at least one of the first plurality of regions or the second plurality of regions, each of the multiple grating pillars doped with the n-type doping or the p-type doping, and each of the multiple grating pillars spaced apart from the PN junction and spaced apart from one another.

In other features, each L-shaped region includes a first portion having a first height relative to a surface of the substrate, each L-shaped region includes a second portion extending perpendicularly from the first portion, the second portion having a second height relative to the surface of the substrate, wherein the second height is greater than the first height, the first plurality of regions have the first height and are arranged adjacent to the first portion of the first L-shaped region, the second plurality of regions have the first height and are arranged adjacent to the first portion of the second L-shaped region, and the first portion of the first L-shaped region and the second L-shaped region, the first plurality of regions, and the second plurality of regions, lie in a plane parallel to the substrate.

In other features, each of the multiple grating pillars extends perpendicularly from a corresponding one of the first plurality of regions or the second plurality of regions. In other features, each of the multiple grating pillars has the second height.

In other features, the multiple grating pillars comprise four grating pillars, a first one of the four grating pillars has a same doping concentration as the first L-shaped region of the PN junction, and a second one of the four grating pillars has a different doping concentration than the first one of the four grating pillars.

In other features, the silicon photonics modulator comprises an optical ring modulator, and the first plurality of regions are located on a side of the PN junction facing a center of a circular waveguide of the silicon photonics modulator. In other features, the multiple grating pillars are disposed only on one or more of the first plurality of regions.

In other features, each of the multiple grating pillars is doped with a same concentration of doping as the corresponding region from which the grating pillar extends. In other features, at least one of the multiple grating pillars is doped with a different concentration of doping as the corresponding region from which the grating pillar extends.

In other features, the first plurality of regions and the first L-shaped region define a total of three different concentrations of p-type doping, and the second plurality of regions and the second L-shaped region define a total of three different concentrations of n-type doping.

In other features, a first one of the multiple grating pillars has a same concentration of doping as the first L-shaped region or the second L-shaped region, and the first one of the multiple grating pillars is spatially located between the first L-shaped regions and other ones of the multiple grating pillars.

In other features, a second one of the multiple grating pillars has a same concentration of doping as one of the first plurality of regions. In other features, the PN junction is a first PN junction, and at least one of the multiple grating pillars includes both p-doping and n-doping, to define a second PN junction.

In other features, a height of each of the multiple grating pillars is greater than a width of each respective grating pillar. In other features, each of the multiple grating pillars have a same height and a same width.

In other features, an electrical resistance of each grating pillar among the multiple grating pillars is less than an electrical resistance of each region among the first plurality of regions and among the second plurality of regions which is disposed intermediate a pair of grating pillars among the multiple grating pillars.

In other features, each of the multiple grating pillars extends perpendicularly from a surface of the substrate. In other features, the silicon photonics modulator comprises an optical ring modulator, and the PN junction is a PN junction of a circular waveguide of the optical ring modulator.

An optical communication device comprising a cascaded ring transmitter chip having multiple optical ring modulators, wherein the cascaded ring transmitter chip is configured to transmit data using wavelength multiplexing, each of the multiple optical ring modulators is disposed adjacent a bus waveguide and optically coupled with the bus waveguide, and each of the multiple optical ring modulators is configured to individually modulate an optical signal at a specific wavelength.

A method of manufacturing a silicon photonics modulator includes selectively coating a silicon substrate with photoresist according to a specified lithography pattern, etching the silicon substrate after coating the silicon substrate with photoresist, to define in the silicon substrate a junction structure and multiple grating pillars, each of the multiple grating pillars spaced apart from the junction structure and spaced apart from one another, doping the multiple grating pillars, a first portion of the junction structure, and a first plurality of regions of the silicon substrate with p-type doping, the first plurality of regions each having different doping concentration which are greater than a doping concentration of the first portion of the junction structure, and doping a second portion of the junction structure, and a second plurality of regions of the silicon substrate with n-type doping, the second plurality of regions each having different doping concentrations which are greater than a doping concentration of the second portion of the junction structure, wherein the first portion and the second portion of the junction structure define a PN junction of a circular waveguide of the silicon photonics modulator.

In other features, the method includes forming a first electrical contact on one of the first plurality of regions having the highest p-type doping, and forming a second electrical contact on one of the second plurality of regions having the highest n-type doping.

In other features, the method includes etching the silicon substrate includes etching portions of the silicon substrate to define the junction structure extending perpendicularly from a top surface of the first plurality of regions, with a top surface of the junction structure at a first height relative to the top surface of the first plurality of regions, and etching the silicon substrate includes etching portions of the silicon substrate to define the multiple grating pillars extending perpendicularly from the first plurality of regions, with a top surface of each of the multiple grating pillars at the first height relative to the top surface of the first plurality of regions Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

A silicon photonics modulator, such as an optical ring modulator, is a key building block of an optical communication system. A key parameter for operation of the modulator is the working bandwidth of the modulator, which indicates a speed of data that may be transmitted in the optical communication system. A higher data bandwidth facilitates faster data transmission.

In a ring modulator (or other type of silicon photonics modulator), bandwidth is limited by resistive-capacitive (RC) delay of the electrical structure of the ring modulator. Most electrical resistance in the ring modulator is due to the doped silicon substrate. In order to confine the optical mode and avoid high absorption loss from doping, the silicon substrate is normally very thin, with light doping. This causes high access resistance (e.g., a high electrical resistance across the doped silicon substrate). Decreasing the access resistance facilitates improving the bandwidth of the ring modulator. Some example embodiments described herein provide a silicon ring modulator with one or more grating pillars, which will lower the electrical resistance across the ring modulator, without increasing the footprint or decreasing the fabrication tolerance of the ring modulator.

Figure 1:
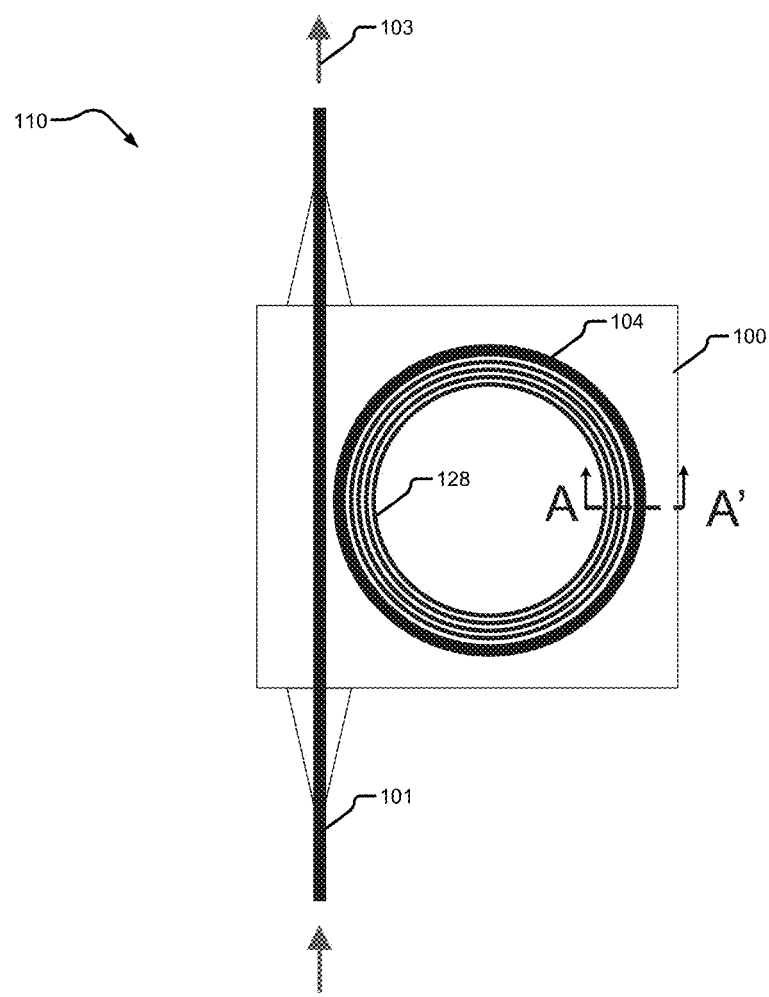
FIG. 1 is a diagram illustrating an example embodiment of a silicon photonics modulator including multiple grating pillars.
Figure 2:
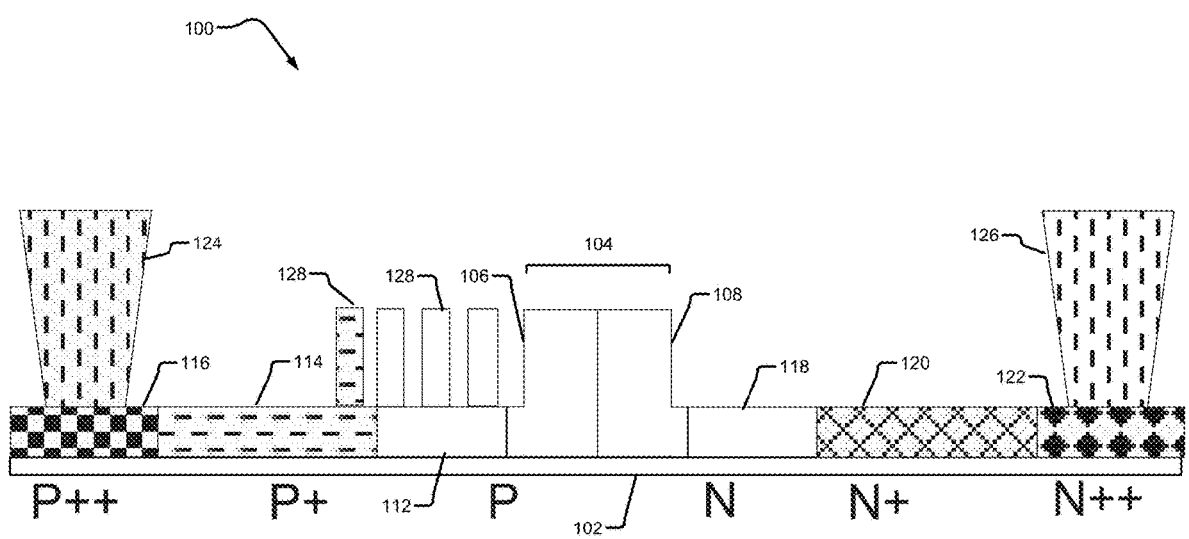
FIG. 2 is a side sectional view of the silicon photonics modulator of FIG. 1, taken at A-A'.

FIGS. 1 and 2 illustrate an example embodiment of an optical ring modulator 100 including a substrate 102 and a PN junction 104 disposed on the substrate. The PN junction 104 is formed by a first L-shaped region 106 doped with a p-type doping, abutting a second L-shaped region 108 doped with an n-type doping.

As shown in FIG. 1, the PN junction 104 is a PN junction of a circular waveguide of the optical ring modulator 100. Although FIG. 1 illustrates a ring modulator having a circular waveguide, other example embodiments may include other types of silicon photonics modulators.

The optical ring modulator 100 is implemented in an optical communication device 110. For example, the optical ring modulator 100 may be part of a cascaded ring transmitter chip. For example, a cascaded ring transmitter chip may include multiple ring modulators which are each disposed along a length of a bus waveguide, for optical coupling between each ring modulator and the bus waveguide. Each ring modulator in the cascaded ring transmitter chip may be operated at different wavelengths, to modulate different wavelengths of optical signals transmitted in the bus waveguide. For example, the cascaded ring transmitter chip may be used to transmit data using wavelength multiplexing technology. Each ring modulator in the cascaded ring transmitter chip individually modulates an optical signal at a specific wavelength, and the modulated light signals are then combined within the bus waveguide and sent out from the cascaded ring transmitter chip.

In the example embodiment of FIG. 1, the optical ring modulator 100 is coupled with a bus waveguide 101 to transmit optical signals 103. Optical signals 103 passing through the waveguide 103 are modulated by the optical ring modulator 100. For example, when the optical signals 103 propagate through the bus waveguide 101 at a specific wavelength, a portion of the light is coupled into the optical ring modulator 103. By applying an electrical signal to the PN junction 104 of the optical ring modulator 100, the concentration of electrons and holes within the PN junction 104 can be changed. This change induces a phase shift in the coupled light. Subsequently, the light is coupled back into the bus waveguide 101 and interferes with the propagating optical signals 103. By controlling the electrical signal applied to the PN junction 104, the optical ring modulator 100 can control the intensity of the optical signals 103 after interference.

Referring to FIG. 2, the optical ring modulator incudes a first plurality of regions 112, 114 and 116 doped with the p-type doping. The regions 112, 114 and 116 are arranged adjacent to the L-shaped region 106 on the substrate (which is doped with the p-type doping). The regions 112, 114 and 116 may each have different p-type doping concentrations than one another.

For example, the concentration of p-type doping may increase moving outward from the PN junction 104. As shown in FIG. 2, the region 112 has a first concentration (P) of doping, the region 114 has a greater concentration (P+) of doping, and the region 116 has the highest concentration (P++) of doping. In some example embodiments, each of the regions 112, 114 and 116 may have a higher concentration of doping than the L-shaped region 106 of the PN junction 104.

The optical ring modulator 100 includes a second plurality of regions 118, 120 and 122 each doped with n-type doping. The regions 118, 120 and 122 are arranged adjacent to the L-shaped region 108 on the substrate 102. The regions 108, 118, 120 and 122 are doped with the n-type doping). The regions 118, 120 and 122 may each having different n-type doping concentrations than one another.

For example, the concentration of n-type doping may increase moving outward from the PN junction 104. As shown in FIG. 2, the region 118 has a first concentration (N) of doping, the region 120 has a greater concentration (N+) of doping, and the region 122 has the highest concentration (N++) of doping. In some example embodiments, each of the regions 118, 120 and 122 may have a higher concentration of doping than the L-shaped region 108 of the PN junction 104.

As shown in FIG. 2, the optical ring modulator 100 includes a first electrical contact 124 and a second electrical contact 126. The electrical contact 124 is disposed on the region 116 having the highest p-type doping concentration, which is also furthest from the PN junction 104. In other embodiments, the electrical contact 124 may be disposed on a different region which has a lower doping concentration, or is closer to the PN junction 104.

The second electrical contact 126 is disposed on the region 122 having the highest n-type doping concentration, which is also furthest from the PN junction 104. In other embodiments, the electrical contact 126 may be disposed on a different region which has a lower doping concentration, or is closer to the PN junction 104. Each electrical contact 124 and 126 may include any suitable conductive material for conducting an electrical signal, such as a metal or a metal alloy (e.g., aluminum, tungsten, etc.).

In the embodiment depicted in FIG. 2, the optical ring modulator includes multiple grating pillars 128. The grating pillars 128 are spaced apart from one another, and are spaced apart from the PN junction 104. In the example embodiment illustrated in FIG. 2, there are four grating pillars 128. In other example embodiments, there may be more or less grating pillars 128, grating pillars may be spaced apart from one another by greater or lesser distances than depicted, and grating pillars may be spaced from the PN junction by greater or lesser distances than depicted.

Each of the grating pillars 128 is disposed on a region of the substrate 102. In the example embodiment illustrated in FIG. 2, three of the grating pillars 128 are disposed on the region 112, and one of the grating pillars is disposed on the region 114. In other example embodiments, grating pillars may be disposed on only one type of doped region, on more than two types of doped regions, with multiple grating pillars on each type of doped region, etc.

As shown in FIG. 2, each L-shaped region 106 and 108 includes a first portion having a first height relative to a surface of the substrate, and a second portion extending perpendicularly from the first portion. The second portion has a second height relative to the surface of the substrate, which is greater than the first height to form the L-shape region.

The first plurality of regions 112, 114 and 116 have the first height, and are arranged adjacent to the first portion of the L-shaped region 106. The second plurality of regions 118, 120 and 122 have the first height and are arranged adjacent to the first portion of the L-shaped region 108.

As shown in FIG. 2, the first portions of the L-shaped regions 106 and 108, the first plurality of regions 112, 114 and 116, and the second plurality of regions 118, 120 and 122, lie in a plane parallel to the substrate. In other example embodiments, heights for different regions may be different from one another.

Each of the grating pillars 128 extends perpendicularly from a corresponding one of the regions 112 or 114. As shown in FIG. 2, each of the grating pillars 128 has a same height as the regions 106 and 108 of the PN junction 104. In other example embodiments, the grating pillars 128 may have a different height than the PN junction 104, and the grating pillars 128 may have a different height than one another.

As shown in FIGS. 1 and 2, the grating pillars 128 are located only on one side of the PN junction 104. In particular, FIG. 1 illustrates that the grating pillars 128 are located on the side of the PN junction 104 facing a center of the circular waveguide of the optical ring modulator 100 (e.g., the grating pillars 128 are disposed on an internal side of the ring modulator 100). This may inhibit optical signals from escaping the PN junction 104 due to the grating pillars 128. For example, placing grating pillars on a side of the PN junction 104 facing outside the circular waveguide may increase the chances of the grating pillars bending optical signal light out of the PN junction 104 (e.g., because a center of light is shifted outward of the bending as the light travels through the circular waveguide, placing a grating pillar 128 facing an outside of the circular waveguide may affect the travel path of the light).

In other example embodiments, the grating pillars 128 may be located on a different side, or both sides, of the PN junction 104. For example, locating grating pillars 128 on both sides of the PN junction 104 may allow for use of a greater number of grating pillars 128 to further reduce electrical resistance between the first electrical contact 124 and the second electrical contact 126.

In some example embodiments, each of the grating pillars 128 is doped with a same concentration of doping as the corresponding region from which the grating pillar extends. For example, as shown in FIG. 2, three of the grating pillars 128 extending upwards from the region 112 may have the same doping concentration as the region 112, and the grating pillar 128 extending upwards from the region 114 may have a same doping concentration as the region 114.

In other example embodiments, the grating pillars 128 may have a different doping concentration than a region from which they extend. For example, the grating pillars 128 may all have a uniform doing concentration, while the regions 112, 114 and 116 have increasing doping concentrations. The doping of the grating pillars 128 may be opposite to doping of the underlaying substate from which the grating pillars extend. In some example embodiments, each grating pillar 128 may have split doping along an axis normal to the substrate, to form a PN junction at the grating pillar 128. For example, one or more of the grating pillars 128 may have p-doping on one side of the grating pillar and n-doping on the other side of the grating pillar, to form an extra PN junction separate from the PN junction 104. In this manner, multiple grating pillars 128 could be doped to create multiple PN junctions of the optical ring modulator 100.

The region 112 adjacent the region 106 of the PN junction 104 may have a same doping concentration as the region 106, and the region 118 adjacent the region 108 of the PN junction 104 may have a same doping concentration as the region 108. In other example embodiments, there may be more or less regions of varying doping concentrations, the grating pillars 128 may have the same or different doping concentrations, p-type and n-type doping may be used on opposite sides of the PN junction 104 with respect to the grating pillars 128, etc.

In the example embodiment shown in FIG. 2, a height of each of the grating pillars 128 is greater than a width of each respective grating pillar 128, and each grating pillar 128 has a same height and width. In other example embodiments, grating pillars 128 may have different heights and widths, and may have different shapes from one another.

An electrical resistance of each grating pillar 128 is less than an electrical resistance of each region 112 or 114 which is disposed intermediate a pair of grating pillars 128. For example, the greater height of each grating pillar 128 may reduce an electrical resistance to current traveling through the optical ring modulator at the grating pillar (e.g., due to a larger cross sectional area of the grating pillar), as compared to an electrical resistance of a region 112 or 114 of the substrate 102 between two grating pillars 128 (where the region 112 or 114 has a smaller cross-sectional area than the grating pillars 128).

Therefore, the grating pillars 128 may reduce an electrical resistance between the electrical contacts 124 and 126 as compared to an optical ring modulator 100 that does not include grating pillars, without affecting the optical signal transmission through the PN junction 104. The reduced electrical resistance may increase a bandwidth of an optical communication device 110 including the optical ring modulator 100 (e.g., due to a faster signal switching frequency across the optical ring modulator).

Figure 3:
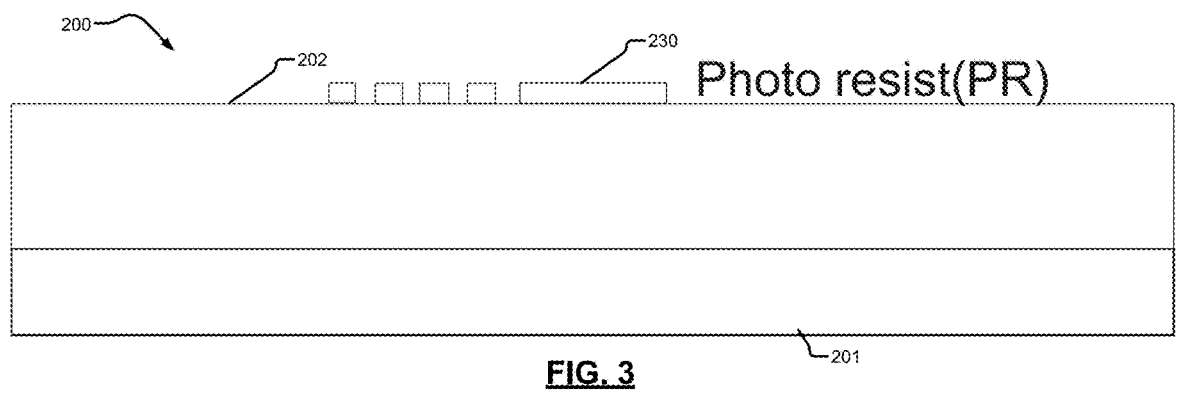
FIG. 3 is a side sectional view illustrating a step of applying photoresist to a substrate during an example method of manufacturing a silicon photonics modulator including multiple grating pillars.

FIGS. 3-10 illustrate an example process for fabricating the optical ring modulator 100 of FIGS. 1 and 2. FIG. 3 is a side sectional view illustrating a step of applying photoresist 230 to a silicon substrate 202. The silicon substrate 202 is disposed on a silicon oxide layer 201, which may be part of a silicon-on-insulator wafer. In other example embodiments, other substrate types may be used.

Figure 4:
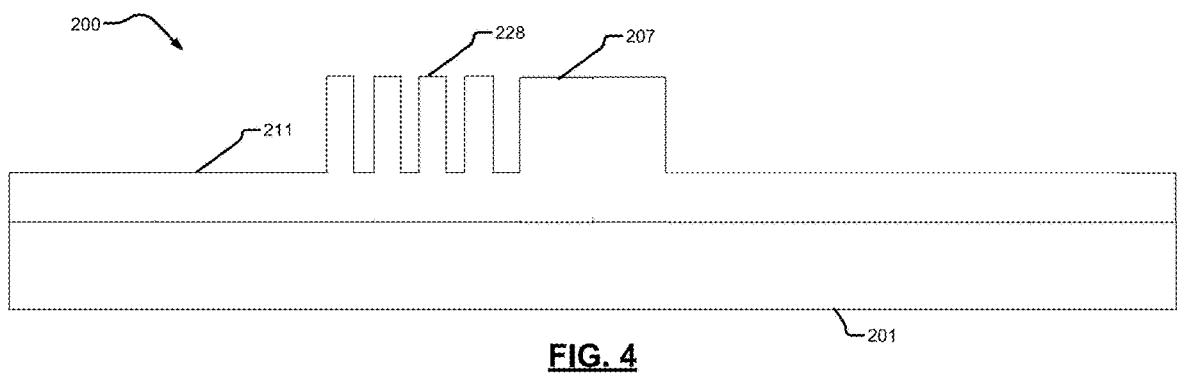
FIG. 4 is a sectional side view of an example silicon photonics modulator fabrication process, after etching is performed on the structure of FIG. 3.

Photoresist 230 conforming to a desired patter is formed on the top surface of the silicon substrate 202, such as by means of lithography techniques. The silicon substrate 202 is then partially etched to form a waveguide and pillars 228, as shown in FIG. 4. For example, the etching may define a junction structure 207, which can be doped to form a PN junction of the waveguide.

The pillars 228 may have a same height as the junction structure 207, in an embodiment. The etched portions may define regions 211 which are at a lower height relative to the top surface of the silicon oxide 201 than the pillars 228 and the junction structure 207.

Figure 5:
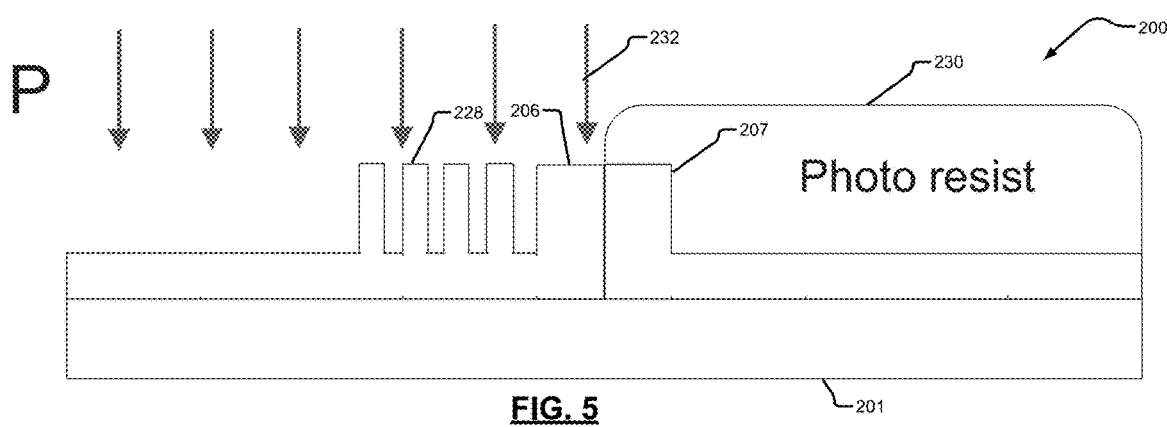
FIG. 5 is a sectional side view of an example silicon photonics modulator fabrication process, including applying doping to regions of the substrate and grating pillars of FIG. 4.

After the photoresist 230 is removed and the structure is cleaned, as shown in FIG. 5, another layer of photoresist 230 is deposited to cover portions of the structure which will be n-doped in a future step. P-type ion implantation doping 232 is then performed to provide a p-type doping concentration in the P-doped region 206 of the PN junction.

The pillars 228 may also be p-doped with a same initial p-doping concentration as the P region 206 of the PN junction (e.g., due to experiencing a same ion implantation process). Regions of the silicon substrate 202 which we etched down to a lower level below the pillars may also be p-doped with a same initial p-doping concentration as the P-doped region 206 of the PN junction.

Figure 6:
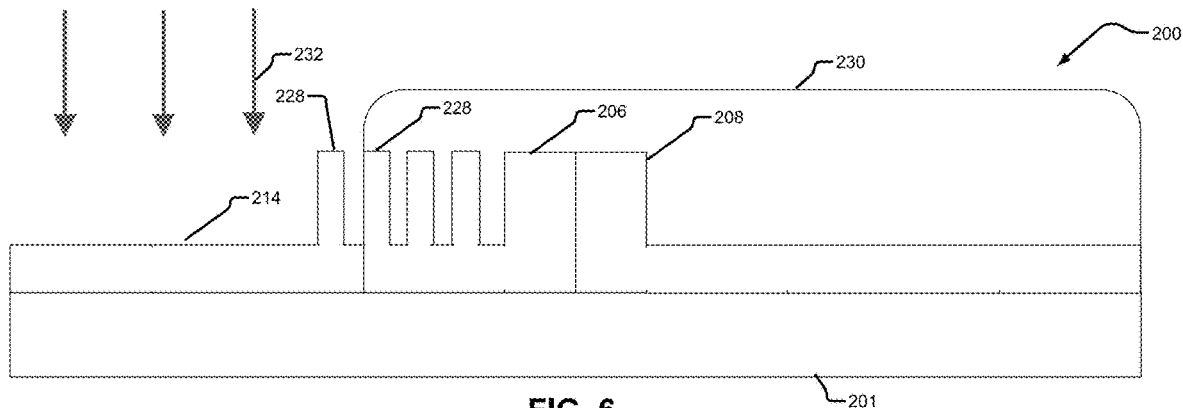
FIG. 6 is a sectional side view of an example silicon photonics modulator fabrication process, including applying a higher concentration of doping to a grating pillar that is furthest from the PN junction of the structure of FIG. 5.

FIG. 6 illustrates coating the P-doped region 206 of the PN junction, and three of the pillars 228, with a layer of photoresist 230. The pillar 228 furthest from the PN junction remains exposed. Another P-type ion implantation doping 232 is performed to provide a higher concentration of p-type doping in the region 214 of the silicon substrate 202 and the pillar 228 furthest from the PN junction.

This results in the region 214 of the silicon substrate 202 and the pillar 228 having a higher doping concentration than the other pillars 228 and the P-doped region 206 of the PN junction. In other embodiments, different numbers of pillars may be used, different numbers of pillars may be doped with different concentrations, etc.

Figure 7:
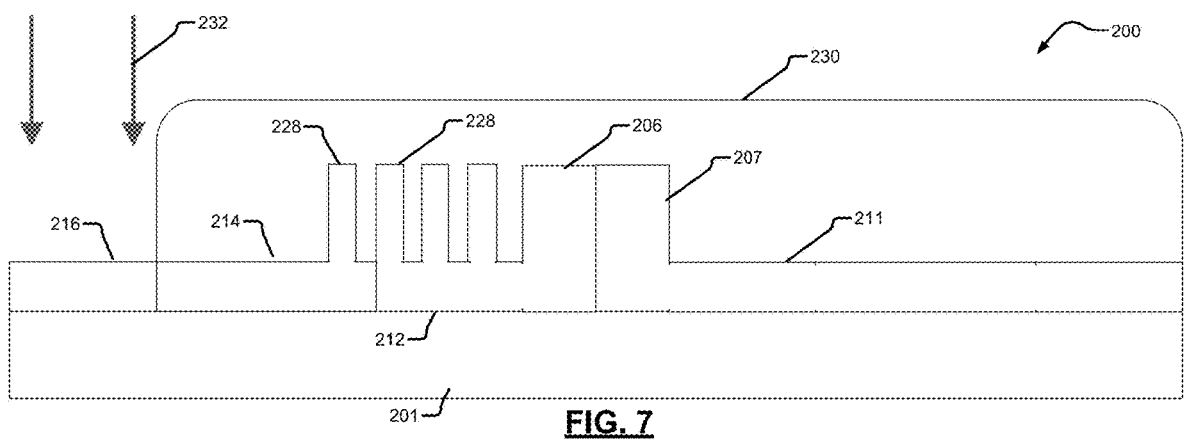
FIG. 7 is a sectional side view of an example silicon photonics modulator fabrication process, including applying a further higher concentration of doping to a region of the substrate that is furthest from the PN junction of the structure of FIG. 6.

FIG. 7 illustrates another photoresist coating 230 covering the region 214 and the final pillar 228. P-type ion implantation doping 232 is performed to create a region 216 of the silicon substrate 202 having a higher doping concentration than the regions 212 and 214, the pillars 228 and the P-doped region 206 of the junction structure.

Figure 8:
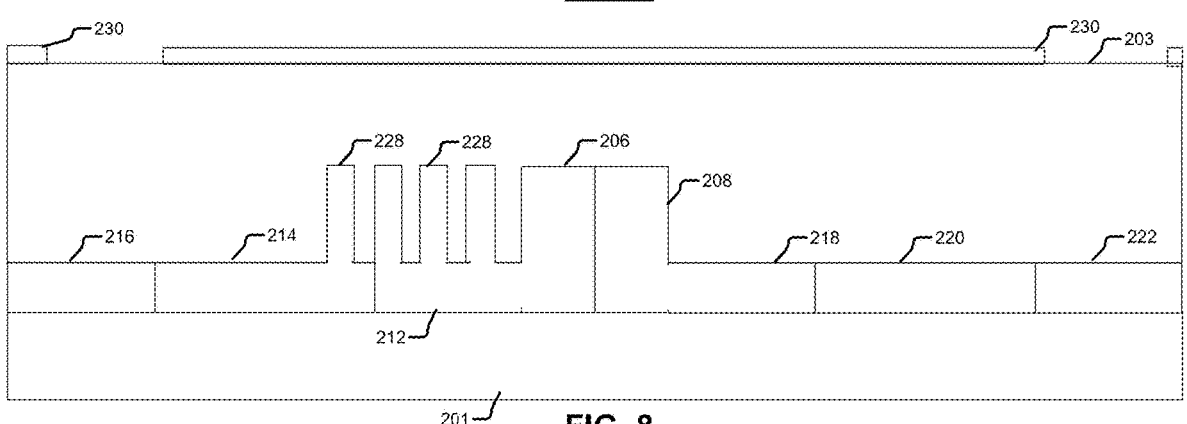
FIG. 8 is a sectional side view of an example silicon photonics modulator fabrication process, including applying a photoresist to a top surface of portions of the structure of FIG. 7.

This process may be repeated on the opposite side of the junction structure 207, to create an N-doped region 208 of the junction structure and multiple N-doped regions 218, 220 and 222, as shown in FIG. 8. A silicon oxide layer 203 is deposited to cover the pillars 228, the PN junction, and the regions 212, 214, 216, 218, 220 and 222.

Figure 9:
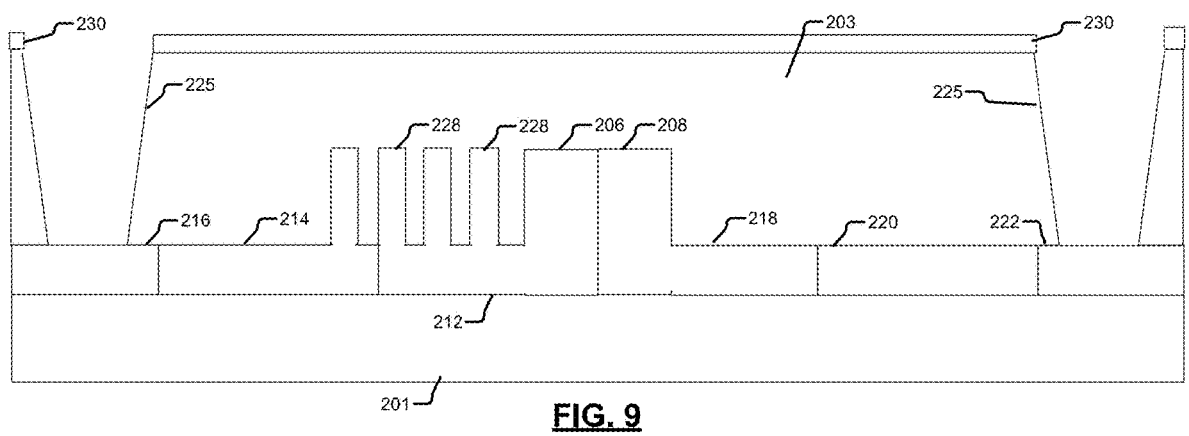
FIG. 9 is a sectional side view of an example silicon photonics modulator fabrication process, including etching portions of the silicon oxide of the structure of FIG. 8.
Figure 10:
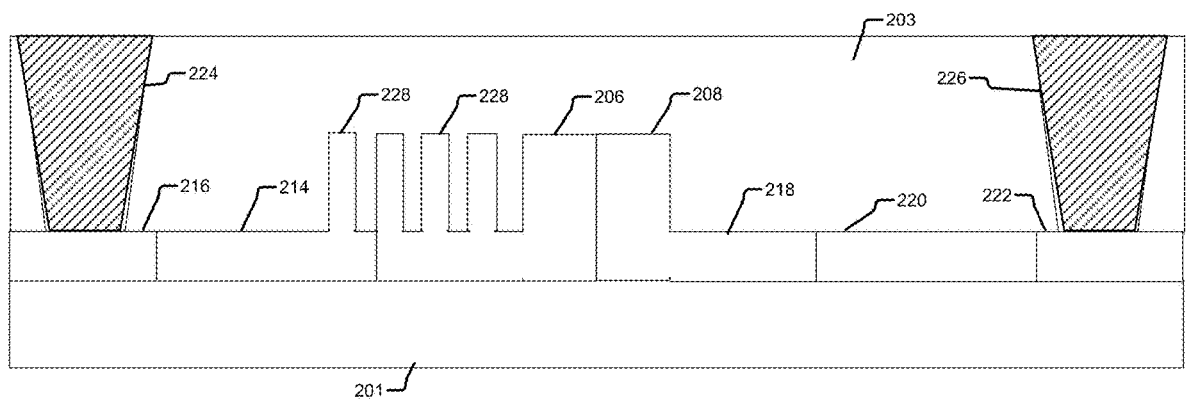
FIG. 10 is a sectional side view of an example silicon photonics modulator fabrication process, including filling an etched portion of the structure of FIG. 9 to define an electrical contact.

A layer of photoresist 230 is placed over the silicon oxide layer 203. The silicon oxide layer is then selectively etched down to the surface of the regions 216 and 222, as shown in FIG. 9, to define spaces 225 for electrical contacts. The etched spaces 225 are then filled with a conductive material (such as metal or a metal alloy) to form electrical conductors 224 and 226 in the etched spaces, as shown in FIG. 10.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It is noted that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between semiconductor layers, etc.) are described using various terms, including "coupled," "adjacent," "below," and "disposed." When a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, apparatus elements described as having particular attributes or performing particular operations are specifically configured to have those particular attributes and perform those particular operations. Specifically, a description of an element to perform an action means that the element is configured to perform the action.

Although the terms first and second may be used herein to describe various elements, components, and/or regions, these elements, components, and/or regions should not be limited by these terms, unless otherwise indicated. These terms may be only used to distinguish one element, component, and/or region from another circuit element, component, and/or region. Terms such as "first," "second," and other numerical terms when used herein do not imply a sequence or order unless clearly indicated by the context.

Thus, a first element, component, and/or region could be termed a second circuit element, component, and/or region without departing from the teachings of the example embodiments.

What is claimed is:

1. A silicon photonics modulator comprising:
a substrate;
a PN junction disposed on the substrate, the PN junction formed by a first L-shaped region doped with a p-type doping abutting a second L-shaped region doped with an n-type doping;
a first plurality of regions doped with the p-type doping arranged adjacent to the first L-shaped region on the substrate, the first plurality of regions each having different doping concentrations which are greater than a doping concentration of the first L-shaped region;
a second plurality of regions doped with the n-type doping arranged adjacent to the second L-shaped region on the substrate, the second plurality of regions each having different doping concentrations which are greater than a doping concentration of the second L-shaped region;
a first electrical contact disposed on one of the first plurality of regions having the highest p-type doping;
a second electrical contact disposed on one of the second plurality of regions having the highest n-type doping; and
multiple grating pillars disposed on at least one of the first plurality of regions or the second plurality of regions, each of the multiple grating pillars doped with the n-type doping or the p-type doping, and each of the multiple grating pillars spaced apart from the first and second L-shaped regions and spaced apart from one another, wherein the multiple grating pillars are configured to decrease electrical resistance between the first electrical contact and the second electrical contact.

2. The silicon photonics modulator of claim 1, wherein:
each L-shaped region includes a first portion having a first height relative to a surface of the substrate;
each L-shaped region includes a second portion extending perpendicularly from the first portion, the second portion having a second height relative to the surface of the substrate, wherein the second height is greater than the first height;
the first plurality of regions have the first height and are arranged adjacent to the first portion of the first L-shaped region;
the second plurality of regions have the first height and are arranged adjacent to the first portion of the second L-shaped region; and
the first portion of the first L-shaped region and the second L-shaped region, the first plurality of regions, and the second plurality of regions, lie in a plane parallel to the substrate.

3. The silicon photonics modulator of claim 2, wherein each of the multiple grating pillars extends perpendicularly from a corresponding one of the first plurality of regions or the second plurality of regions.

4. The silicon photonics modulator of claim 2, wherein each of the multiple grating pillars has the second height.

5. The silicon photonics modulator of claim 1, wherein:
the multiple grating pillars comprise four grating pillars;
a first one of the four grating pillars has a same doping concentration as the first L-shaped region of the PN junction; and
a second one of the four grating pillars has a different doping concentration than the first one of the four grating pillars.

6. The silicon photonics modulator of claim 1, wherein:
the silicon photonics modulator comprises an optical ring modulator; and
the first plurality of regions are located on a side of the PN junction facing a center of a circular waveguide of the silicon photonics modulator.

7. The silicon photonics modulator of claim 6, wherein the multiple grating pillars are disposed only on one or more of the first plurality of regions.

8. The silicon photonics modulator of claim 1, wherein each of the multiple grating pillars is doped with a same concentration of doping as the corresponding region from which the grating pillar extends.

9. The silicon photonics modulator of claim 1, wherein at least one of the multiple grating pillars is doped with a different concentration of doping as the corresponding region from which the grating pillar extends.

10. The silicon photonics modulator of claim 1, wherein:
the first plurality of regions and the first L-shaped region define a total of three different concentrations of p-type doping; and
the second plurality of regions and the second L-shaped region define a total of three different concentrations of n-type doping.

11. The silicon photonics modulator of claim 1, wherein:
a first one of the multiple grating pillars has a same concentration of doping as the first L-shaped region or the second L-shaped region; and
the first one of the multiple grating pillars is spatially located between the first L-shaped region and other ones of the multiple grating pillars.

12. The silicon photonics modulator of claim 11, wherein a second one of the multiple grating pillars has a same concentration of doping as one of the first plurality of regions.

13. The silicon photonics modulator of claim 1, wherein:
the PN junction is a first PN junction; and
at least one of the multiple grating pillars includes both p-doping and n-doping, to define a second PN junction.

14. The silicon photonics modulator of claim 1, wherein a height of each of the multiple grating pillars is greater than a width of each respective grating pillar.

15. The silicon photonics modulator of claim 14, wherein each of the multiple grating pillars have a same height and a same width.

16. The silicon photonics modulator of claim 1, wherein an electrical resistance of each grating pillar among the multiple grating pillars is less than an electrical resistance of each region among the first plurality of regions and among the second plurality of regions which is disposed intermediate a pair of grating pillars among the multiple grating pillars.

17. The silicon photonics modulator of claim 1, wherein each of the multiple grating pillars extends perpendicularly relative to a surface of the substrate.

18. The silicon photonics modulator of claim 1, wherein:
the silicon photonics modulator comprises an optical ring modulator; and
the PN junction is a PN junction of a circular waveguide of the optical ring modulator.

19. An optical communication device comprising a cascaded ring transmitter chip having multiple optical ring modulators including the optical ring modulator of claim 18, wherein:
the cascaded ring transmitter chip is configured to transmit data using wavelength multiplexing;
each of the multiple optical ring modulators is disposed adjacent a bus waveguide and optically coupled with the bus waveguide; and
each of the multiple optical ring modulators is configured to individually modulate an optical signal at a specific wavelength.

20. A method of manufacturing a silicon photonics modulator, the method comprising:
selectively coating a silicon substrate with photoresist according to a specified lithography pattern;
etching the silicon substrate after coating the silicon substrate with photoresist, to define in the silicon substrate a junction structure and multiple grating pillars, each of the multiple grating pillars spaced apart from the junction structure and spaced apart from one another;
doping the multiple grating pillars, a first portion of the junction structure, and a first plurality of regions of the silicon substrate with p-type doping, the first plurality of regions each having different doping concentration which are greater than a doping concentration of the first portion of the junction structure;
doping a second portion of the junction structure, and a second plurality of regions of the silicon substrate with n-type doping, the second plurality of regions each having different doping concentrations which are greater than a doping concentration of the second portion of the junction structure, wherein the first portion and the second portion of the junction structure define a PN junction of a waveguide;
forming a first electrical contact on one of the first plurality of regions having the highest p-type doping; and
forming a second electrical contact on one of the second plurality of regions having the highest n-type doping,
wherein each of the multiple grating pillars is spaced apart from the first portion and the second portion, and wherein the multiple grating pillars are configured to decrease electrical resistance between the first electrical contact and the second electrical contact.

21. The method of claim 20, wherein the waveguide is circular.

22. The method of claim 20, wherein:
etching the silicon substrate includes etching portions of the silicon substrate to define the junction structure extending perpendicularly from a top surface of the first plurality of regions, with a top surface of the junction structure at a first height relative to the top surface of the first plurality of regions; and
etching the silicon substrate includes etching portions of the silicon substrate to define the multiple grating pillars extending perpendicularly from the first plurality of regions, with a top surface of each of the multiple grating pillars at the first height relative to the top surface of the first plurality of regions.

* * * * *